United States Patent
Uhlenbrock et al.

(10) Patent No.: US 9,616,569 B2
(45) Date of Patent: Apr. 11, 2017

(54) METHOD FOR CALIBRATING AN ARTICULATED END EFFECTOR EMPLOYING A REMOTE DIGITAL CAMERA

(71) Applicant: GM GLOBAL TECHNOLOGY OPERATIONS LLC, Detroit, MI (US)

(72) Inventors: Ryan M. Uhlenbrock, Los Angeles, MI (US); Heiko Hoffmann, Simi Valley, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 101 days.

(21) Appl. No.: 14/602,519

(22) Filed: Jan. 22, 2015

(65) Prior Publication Data

US 2016/0214255 A1 Jul. 28, 2016

(51) Int. Cl.
*B25J 9/16* (2006.01)
*G06T 7/00* (2017.01)

(52) U.S. Cl.
CPC .......... *B25J 9/1653* (2013.01); *B25J 9/1674* (2013.01); *B25J 9/1697* (2013.01); *G06T 7/0046* (2013.01); *Y10S 901/09* (2013.01); *Y10S 901/47* (2013.01)

(58) Field of Classification Search
CPC .... G06T 7/0044; G06T 7/0046; B25J 9/1653; B25J 9/1674; B25J 9/1697
See application file for complete search history.

(56) References Cited

U.S. PATENT DOCUMENTS

| | | | |
|---|---|---|---|
| 5,471,312 | A | 11/1995 | Watanabe et al. |
| 8,363,930 | B1 | 1/2013 | Francis, Jr. et al. |
| 2009/0074238 | A1* | 3/2009 | Pfister .................. G06T 7/0046 382/100 |

(Continued)

FOREIGN PATENT DOCUMENTS

| | | |
|---|---|---|
| DE | 19616276 A1 | 10/1997 |
| DE | 112008002862 T5 | 12/2010 |
| EP | 2543482 A1 | 1/2013 |

OTHER PUBLICATIONS

Eggert et al., "Estimating 3-D rigid body transformation: a comparison of four major algorithms", Machine Vision and Applications, 1997.*

(Continued)

*Primary Examiner* — Adam Mott
(74) *Attorney, Agent, or Firm* — Quinn Law Group, PLLC (57) ABSTRACT

A method for calibrating an articulable end effector of a robotic arm employing a digital camera includes commanding the end effector to achieve a plurality of poses. At each commanded end effector pose, an image of the end effector with the digital camera is captured and a scene point cloud including the end effector is generated based upon the captured image of the end effector. A synthetic point cloud including the end effector is generated based upon the commanded end effector pose, and a first position of the end effector is based upon the synthetic point cloud, and a second position of the end effector associated with the scene point cloud is determined. A position of the end effector is calibrated based upon the first position of the end effector and the second position of the end effector for the plurality of commanded end effector poses.

12 Claims, 3 Drawing Sheets

(56) References Cited

U.S. PATENT DOCUMENTS

2011/0280472 A1* 11/2011 Wallack ................. B25J 9/1692
382/153
2012/0114181 A1* 5/2012 Borthwick ............ G06T 7/0075
382/104
2015/0003723 A1 1/2015 Huang et al.

OTHER PUBLICATIONS

Dekun Yang, John Illingworth; "Calibrating a Robot Camera"; Department of Electronics and Electrical Engineering, University of Surrey, Guildford. GU2 5XH; BMVC 1994 doi:10.5244/C.8.51.

Maxime Latulippe, Alexandre Drouin, Philippe Giguere, Francois Laviolette; "Accelerated Robust Point Cloud Registration in Natural Environments through Positive and Unlabeled Learning"; Proceedings of the Twenty-Third International Joint Conference on Artificial Intelligence.

Radu Bogdan Rusu, Gary Bradski, Romain Thibaux, John Hsu; "Fast 3D Recognition and Pose Using the Viewpoint Feature Histogram"; Willow Garage 68 Willow Rd, Meno Park, CA 94025, USA.

Radu Bogdan Rusu; "Semantic 3D Object Maps for Everyday Manipulation in Human Living Environments"; Dissertation—Institut fur Informatik der Technischen Universitat Muchen, Jul. 14, 2009.

Emmanuel Perez Bonnal; "3D Mapping of indoor environments using RGB-D Kinect camera for robotic mobile application"; Politecnico Di Torin, Department of Control and Computer Engineering.

\* cited by examiner

METHOD FOR CALIBRATING AN ARTICULATED END EFFECTOR EMPLOYING A REMOTE DIGITAL CAMERA

TECHNICAL FIELD

The disclosure relates to robotic arms employing articulated end effectors, and methods for calibration thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Robot-camera calibration accuracy is essential for effective use of visual sensor-guided robotic platforms. Known methods for robot-camera calibration include determining extrinsic characteristics that describe a relative position and orientation of the camera with regard to a coordinate system of interest. Known calibration methods rely on human supervision to manually provide corresponding points in a camera's reference frame by inspecting images from the camera and marking a location of a robot end effector or some other fiducial marker. This method may be accurate and suitable for a one-time calibration, but can prove tedious for a flexible manufacturing environment where calibration needs to be performed frequently. Other known methods find the corresponding points by using computer vision and employing special calibration objects, calibration patterns, or other fiducials placed in the robot's workspace or attached to the end effector. Such calibration objects can include, e.g., a checkerboard pattern or an LED. Use of a calibration pattern can be problematic in that they may not be suitable for a particular work environment, may disrupt normal operating conditions, and may require position and pattern calibrations, thus increasing the quantity of correspondences and the complexity of the optimization.

SUMMARY

A method for calibrating an articulable end effector of a robotic arm employing a digital camera includes commanding the end effector to achieve a plurality of poses. At each commanded end effector pose, an image of the end effector is captured with the digital camera and a scene point cloud including the end effector is generated based upon the captured image of the end effector. A synthetic point cloud including the end effector is generated based upon the commanded end effector pose, and a first position of the end effector is based upon the synthetic point cloud, and a second position of the end effector associated with the scene point cloud is determined. A position of the end effector is calibrated based upon the first position of the end effector and the second position of the end effector for the plurality of commanded end effector poses.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
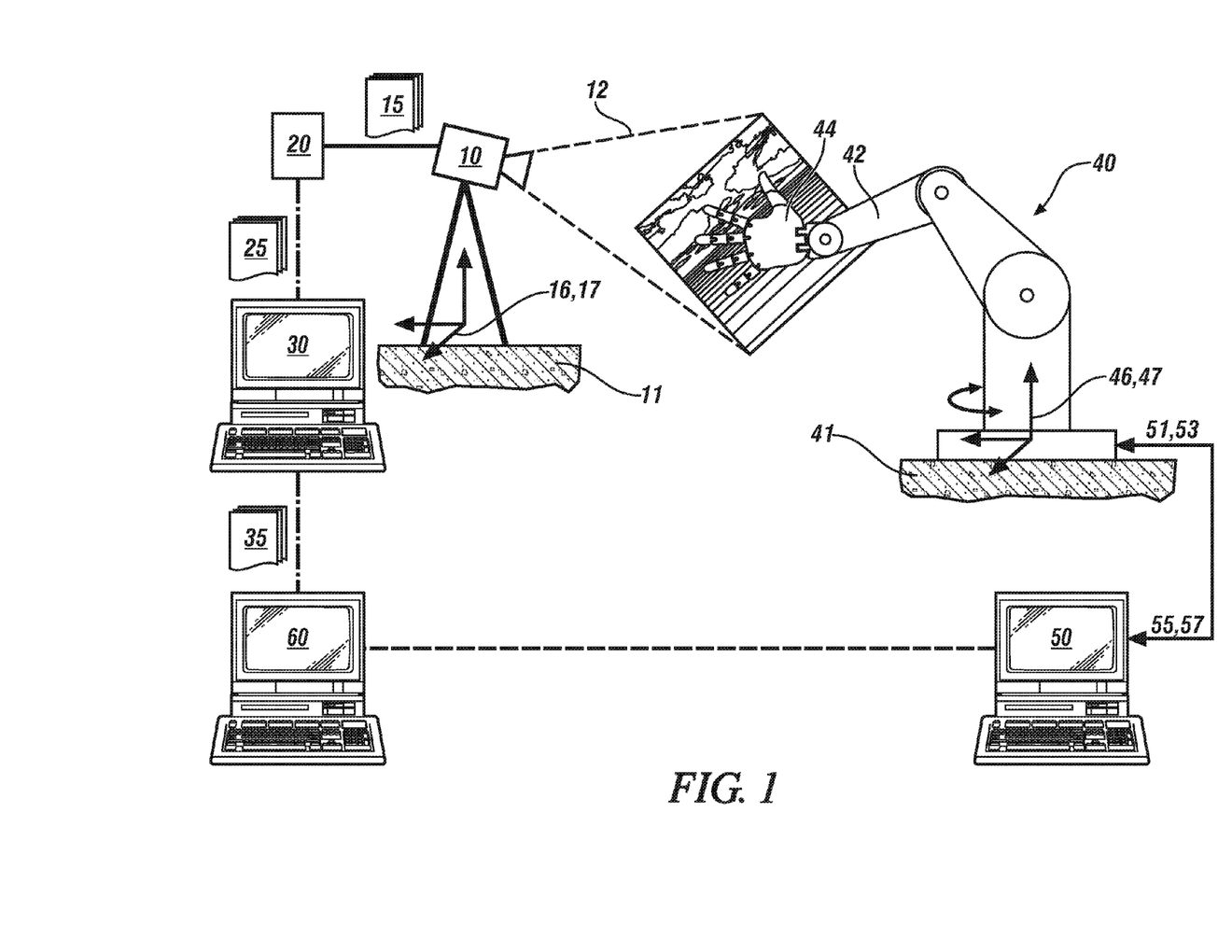
FIG. 1 schematically illustrates a robotic device having an articulable end effector and an external vision system including an image detector (camera) and an accompanying plurality of controllers for monitoring and control thereof, in accordance with the disclosure, FIG. 2 schematically shows an embodiment of a calibration process configuration for developing a spatial position calibration of a robotic device having an articulable end effector in relation to a 3D image of the articulable end effector originating from a remotely mounted digital camera, in accordance with the disclosure.

Referring now to the drawings, wherein the depictions are for the purpose of illustrating certain exemplary embodiments only and not for the purpose of limiting the same, FIG. 1 schematically illustrates a robotic device 40 including a multi-link robotic arm 42 having an articulable end effector 44 and an external vision system including a remote image detector (camera) 10 and an accompanying plurality of controllers for monitoring and control thereof. The camera 10 is capable of capturing, processing and storing an image of a field of view (FOV) 12 that includes the articulable end effector 44.

The camera 10 is preferably a stereo device capable of capturing a three-dimensional (3D) image 15, and signally connects to an encoder 20 that signally connects to a camera controller 30. The camera 10 is fixedly mounted on a stand resting on a first ground surface 11, which is described in context of a first frame of reference 16 in the form of a first xyz-coordinate system having a first point of origin 17 associated with the camera 10, with the x and y coordinates defined by the first ground surface 11 and the z coordinate orthogonal to the first ground surface 11. The camera 10 can be at any position and orientation relative to the robotic device 40 and the articulable end effector 44 in the FOV 12. The camera 10 is remote from the robotic device 40 in that a movement of the robotic device 40 will not effect a corresponding movement of the camera 10.

In one embodiment, the 3D image 15 captured by the camera 10 is a bitmap image file in the form of a 24-bit stereo image including RGB (red-green-blue) values and depth values that represent the FOV 12. Other embodiments of the 3D image 15 can include a 3D image depicting a black-and-white or a grayscale representation of the 3D FOV 12, or other image representations without limitation. The camera 10 includes an image acquisition sensor that signally connects to the encoder 20 that executes digital signal processing (DSP) on the 3D image 15. The image acquisition sensor captures pixels in the FOV 12 at a predetermined resolution, and the encoder 20 generates a bitmap image file 25 of the FOV 12, e.g., an 8-bit bitmap of the pixels representing the FOV 12 at a predefined resolution. The encoder 20 generates the bitmap image file 25, which is communicated to the camera controller 30. The bitmap image file 25 is an encoded datafile stored in a non-transitory digital data storage medium in one embodiment.

The bitmap image file 25 includes a digital representation of a 3D image that includes the articulable end effector 44 of the robotic arm 42, and represents an original image of the FOV 12 captured at the original resolution of the camera 10. The 3D image 15 of the articulable end effector 44 captured by the camera 10 contains sufficient information for the camera controller 30 to analyze and quantify the position of the articulable end effector 44 in relation to the camera 10. The perceived shape of the articulable end effector 44 depends upon the relative viewing angles and distance between the camera 10 and the articulable end effector 44 after influences associated with illumination and reflectivity have been accounted for and the camera 10 has been calibrated. The camera controller 30 generates a scene point cloud 35 from the bitmap image file 25 that includes the articulable end effector 44 of the robotic arm 42. In one embodiment, the scene point cloud 35 includes the entire bitmap image file 25. Alternatively, the scene point cloud 35 includes a portion of the bitmap image file 25 associated with the articulable end effector 44 of the robotic arm 42 that has been extracted from the bitmap image file 25 to reduce memory space requirements. Point clouds and point cloud feature extraction techniques are known. The camera controller 30 communicates the scene point cloud 35 to a system controller 60.

The robotic device 40 preferably rests on a second ground surface 41, which is described in context of a second frame of reference 46 in the form of a second xyz-coordinate system having a second point of origin 47 associated with the robotic device 40, with the x and y coordinates defined by the second ground surface 41 and the z coordinate orthogonal to the second ground surface 41. The robotic device 40 includes a controllable multi-link arm 42 to which the articulable end effector 44 attaches. The end effector 44 attaches to the end of the robotic arm 42 as its hand, tool, manipulator, etc. It is articulated, i.e. capable of moving its joints and changing its shape. The multi-link arm 42 and the end effector 44 are configured to controllably selectively pivot, extend and rotate in response to arm commands 51 and end effector commands 53, respectively, generated by a robot controller 50. Arm commands 51 control movement of the multi-link arm 42 and end-effector commands 53 control movement of the articulable end effector 44. Movement of the multi-link arm 42 and the articulable end effector 44 is described in context of the second frame of reference 46, with the x and y coordinates defined by the second ground surface 41 and the z coordinate orthogonal to the second ground surface 41. The multi-link arm 42 and the articulable end effector 44 are equipped with position sensing devices in the form of angle measurement devices at each articulation joint or other suitable position sensing devices and methods to determine rotation(s) thereat. Measured arm positions 55 represent a measured position of the multi-link arm 42 including the angles associated with the articulation joints of the multi-link arm 42 and commanded poses 57 represent measured angles associated with the articulable end effector 44, with the measured arm positions 55 described in context of the second frame of reference 46. Other details related to multi-link arms 42 and articulable end effectors 44 and commands for controlling them are known and are not described in detail herein. The first frame of reference 16 including the first xyz-coordinate system having the first point of origin 17 as shown and the second frame of reference 46 including the second xyz-coordinate system having the second point of origin 47 are illustrative. Other frames of reference describing positions of the camera 10 and the robotic device 40 may be employed with equal effect. By way of a non-limiting example, the first frame of reference 16 may instead locate the point of origin for the first frame of reference 16 on the camera 10.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, routines, code, algorithms and similar terms mean any controller-executable instruction set including calibrations and look-up tables. The term 'model' refers to a processor-based or processor-executable code that simulates a physical existence or a physical process. Communications between controllers, and between controllers, actuators and/or sensors may be accomplished using a direct wired link, a networked communications bus link, a wireless link or any another suitable communications link.

Figure 2:
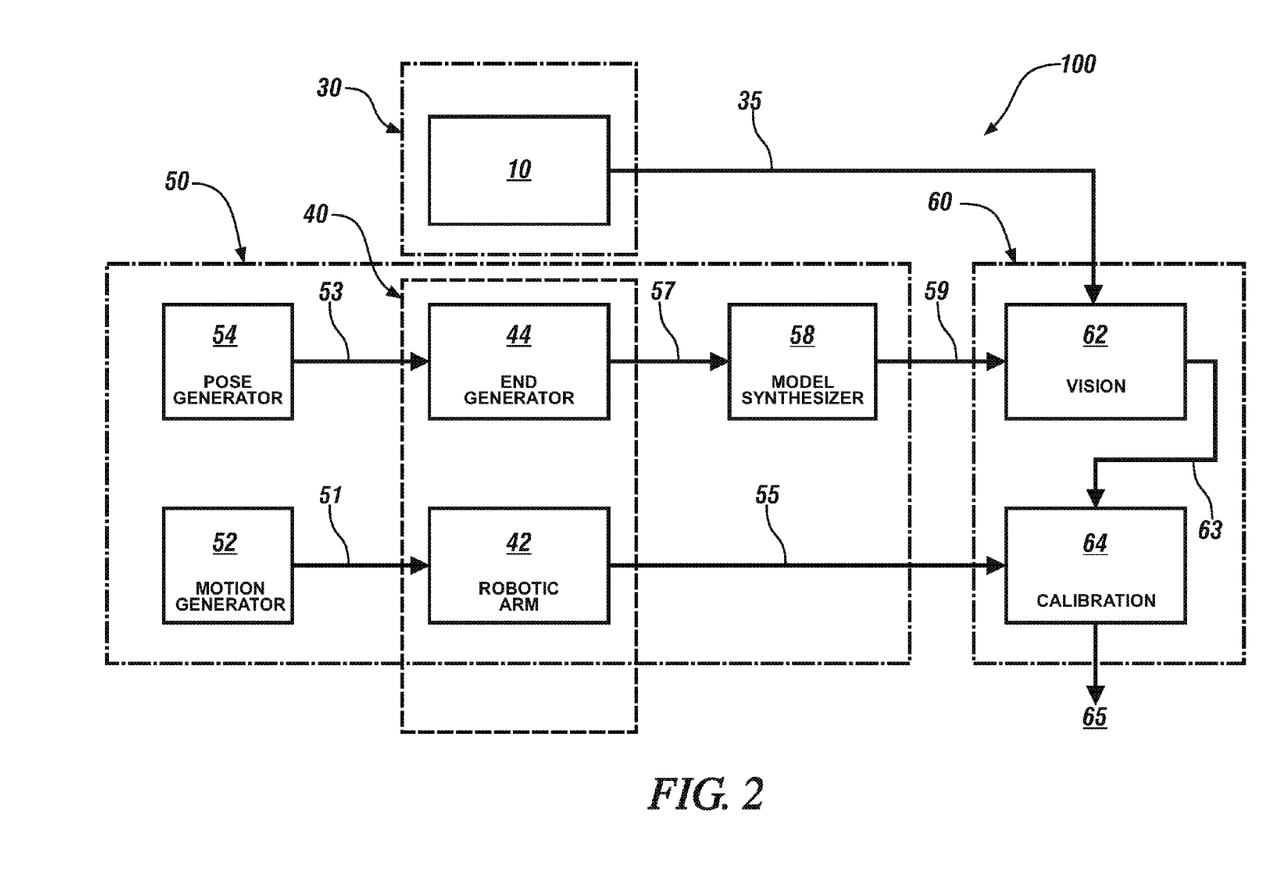

FIG. 2 schematically shows an embodiment of a calibration process configuration 100 for developing a spatial position calibration of a robotic device having an articulable end effector in relation to a 3D image of the articulable end effector originating from a remotely mounted digital camera. The calibration process configuration 100 is described with reference to the robotic device 40, camera 10, first frame of reference 16, second frame of reference 46 and accompanying camera, robot and system controllers 30, 50, 60 described in FIG. 1. The calibration process configuration 100 employs signals captured by the camera 10 representing a 3D image of the articulable end effector 44 and commands for positioning the articulable end effector 44 to achieve a desired position. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form that is employed to determine a position of the end effector 44 based upon signals captured by the camera 10, including a geometric translation between the first frame of reference 16 and the second frame of reference 46. The calibration process configuration 100 includes an arrangement of communications and command signals between the system controller 60, the robot controller 50 and the camera controller 30, and includes employing signals from the camera 10 to determine a position of the end effector 44.

The robot controller 50 generates and sends arm commands 51 and end-effector commands 53 to position the end effector 44 and uses inverse kinematics to move the end effector 44 to those positions. The robot controller 50 uses forward kinematics to compute the position of the end effector 44 relative to the second frame of reference 46 associated with the robotic device 40 based on currently measured joint angles.

The robot controller 50 includes a motion generator 52 to determine the arm commands 51, which includes a series of positions to which the robotic arm 42 is moved during calibration. The positions are not coplanar nor occluded from the view of the camera 10 but are otherwise arbitrary. The motion generator 52 sequentially commands the robotic arm 42 to each of a series of desired point locations in space and stabilizes for purposes of measurement and pose capture by the camera 10. Each of the arm commands 51 is provided with a time-stamp or other identifier that can be included in a datafile for correlation with the scene point cloud 35 that is captured by the camera 10.

The robot controller 50 includes a pose generator 54 to determine end effector commands 53, which include a series of positions to which the end effector 44 is moved at each of the arm commands 51 during calibration, referred to herein as commanded poses (i,j). The pose generator 54 sequentially commands the end effector 44 to each of a series of commanded poses (i,j) at which it stabilizes for purposes of measurement and capture of the scene point cloud 35 by the camera 10, with each of the end effector commands 53 provided with a time-stamp or other identifier that can be included in a datafile for correlation with the scene point cloud 35 captured by the camera 10. The end effector commands 53 are intended to articulate the end effector 44 to create variability in its shape and more distinctive 3D features which improve the accuracy of the model matching in the vision component.

The robot controller 50 determines a plurality of commanded poses 57 for each of the end effector commands 53 at each of the arm commands 51, with the actual positions associated with the commanded poses 57 determined from position sensors in the second frame of reference 46. The plurality of commanded poses 57 are provided as inputs to a model synthesizer 58.

The model synthesizer 58 generates a synthetic point cloud 59 of the end effector's surface in its commanded articulated shape. In one embodiment this includes employing a solid model of the end effector's geometry from a computer-aided design (CAD) tool to synthesize the point cloud for each commanded pose 57. Points are randomly sampled from the geometry of the solid model until the resulting synthetic point cloud 59 has sufficient density for model matching.

The camera controller 30 generates the scene point cloud 35 based upon signal input from the camera 10 for each of the poses of the robotic device 40. A scene point cloud 35 that includes the end-effector 44 of the robotic device 40 is extracted to determine a measured pose (i,j) that is described with reference to the first frame of reference 16.

The system controller 60 includes a vision component 62 to determine a position of the end effector 44 relative to the camera 10 for each commanded pose (i,j) employing the scene point cloud 35 and the synthesized point cloud model 59.

The vision component 62 employs 3D model matching algorithms to locate the end effector in the scene and estimate its pose. It is implemented in several stages, including routines that compute Fast Point Feature Histogram (FPFH) features for the synthesized point cloud model 59 and the full scene point cloud, finding a rough pose of the end effector in the FOV 12 employing routines that implement and execute Sample Consensus-Initial Alignment (SAC-IA) routines on the data, roughly segmenting a full scene to a partial scene by a spherical filter with a radius that is three times the radius of a bounding sphere of the synthesized point cloud model 59 at the position found by SAC-IA, computing FPFH features for the partial scene, using SAC-IA to find the pose of the end effector in the partial scene, segmenting the partial scene to a refined scene by a spherical filter with radius that is the same as the radius of the synthetic model at the position found by execution of the SAC-IA routine, and estimating a pose of the end effector in the refined scene using an Iterative Closest Point (ICP) routine starting from the pose found by execution of the most recent SAC-IA routine to determine vision system-detected end-effector positions 63 relative to the camera 10. Routines and methodologies associated with SAC-IA and ICP are known and not described in detail herein.

A FPFH is derived from a Point Feature Histogram (PFH), which is employed to accurately and robustly classify points with respect to their underlying surface. The PFH is a histogram that collects the pairwise pan, tilt and yaw angles between every pair of normals on a surface patch associated with a field of view. The FPFH measures the same angular features as PFH, but estimates the sets of values only between every point and its quantity of k nearest neighbors, followed by a reweighting of the resultant histogram of a point with the neighboring histograms, thus reducing the computational complexity. FPFH derivation is known and not discussed in further detail.

An SAC-IA routine executes to roughly find a pose of the end effector in a FOV 12. The FOV 12 is roughly segmented down to partial FOVs by a spherical filter with radius that is three times the radius of the synthetic model at the position found by the SAC-IA routine. The SAC-IA routine is an algorithm that uses FPFH to realize a first alignment between two different point clouds P and Q. It includes three principal steps. SAC-IA selects s sample points from point cloud P making sure that their pairwise distances are greater than a certain minimum distance (dmin). The pairwise distance is set to 40 cm in one embodiment. SAC-IA finds a list of points in point cloud Q whose FPFH histograms are similar to the sample points' histogram for each of the sample points. It selects one randomly from the list and this point will be considered as that sample points' correspondence. SAC-IA computes the rigid transformation defined by the sample points and their correspondences and computes an error metric for the point cloud that allows to find the quality of the transformation.

The system controller 60 includes a calibration calculator 64 that employs the vision system-detected end-effector position 63 relative to the camera 10 and the measured arm positions 55 indicating the measured position of the multi-link arm 42 to determine a robot-camera calibration 65. The vision system-detected end-effector position 63 relative to the camera 10 generates a first pose that is referred to herein as scene pose (i,j), which is described in context of the first frame of reference 16 having a first point of origin 17 associated with the camera 10. The second pose is a measured pose (i,j) including the measured arm positions 55 indicating the measured position of the multi-link arm 42, and is described in context of the second frame of reference 46 having a second point of origin 47 associated with the robotic device 40.

The calibration calculator 64 receives the set of corresponding points relative to the camera 10 and relative to the robotic device 40. The robot-camera calibration 64 is represented by a rigid body transformation matrix consisting of a 3×3 rotation matrix R and a 3×1 translation T. The rigid body transformation includes pair-wise alignment of the vision system-detected end-effector position 63 relative to the camera 10 for pose (i,j) in the first frame of reference 16 and the measured position of the end effector for pose (i,j) in the second frame of reference 46 by means of suitable rotations, translations, reflections and combinations thereof. The rigid body transformation matrix includes a 3×3 rotation matrix R and a 3×1 translation T. Given an N×3 matrix A of the points a, relative to the camera, i.e., the captured position of the end effector 44 relative to the camera 10 for pose (i,j) in the first frame of reference 16 and N×3 matrix B of the points $b_i$ relative to the robot, i.e., the measured position of the end effector for pose (i,j) in the second frame of reference 46, the calibration can be determined employing a singular value decomposition-based transformation estimation as follows.

$$mean_A = \frac{1}{N}\sum a_i, \ mean_B = \frac{1}{N}\sum b_i \quad [1]$$

$$\overline{A} = A - mean_A, \ \overline{B} = B - mean_B$$

$$U\Sigma V^T = \overline{B}^T\overline{A} \text{ is a singular value decomposition}$$

$$U(:,2) = U(:,2) \cdot det(UV^T) \text{ and}$$

$$R = UV^T, \ T = mean_A - R \cdot mean_B$$

wherein U(:,2) refers to the second column of the matrix U and det( ) refers to the matrix determinant.

The singular value decomposition (SVD) is a factorization that exists for any matrix, decomposing it into three matrices U, Σ, and V, where U is a unitary matrix, Σ is a diagonal matrix with non-negative diagonal, and V is a unitary matrix. The use of SVD does not depend on any particular algorithm for computing the SVD. One such algorithm involves reducing the matrix to bidiagonal form using Householder reflections and using the QR algorithm to compute the eigenvalues. Other algorithms may be similarly employed.

Figure 3:
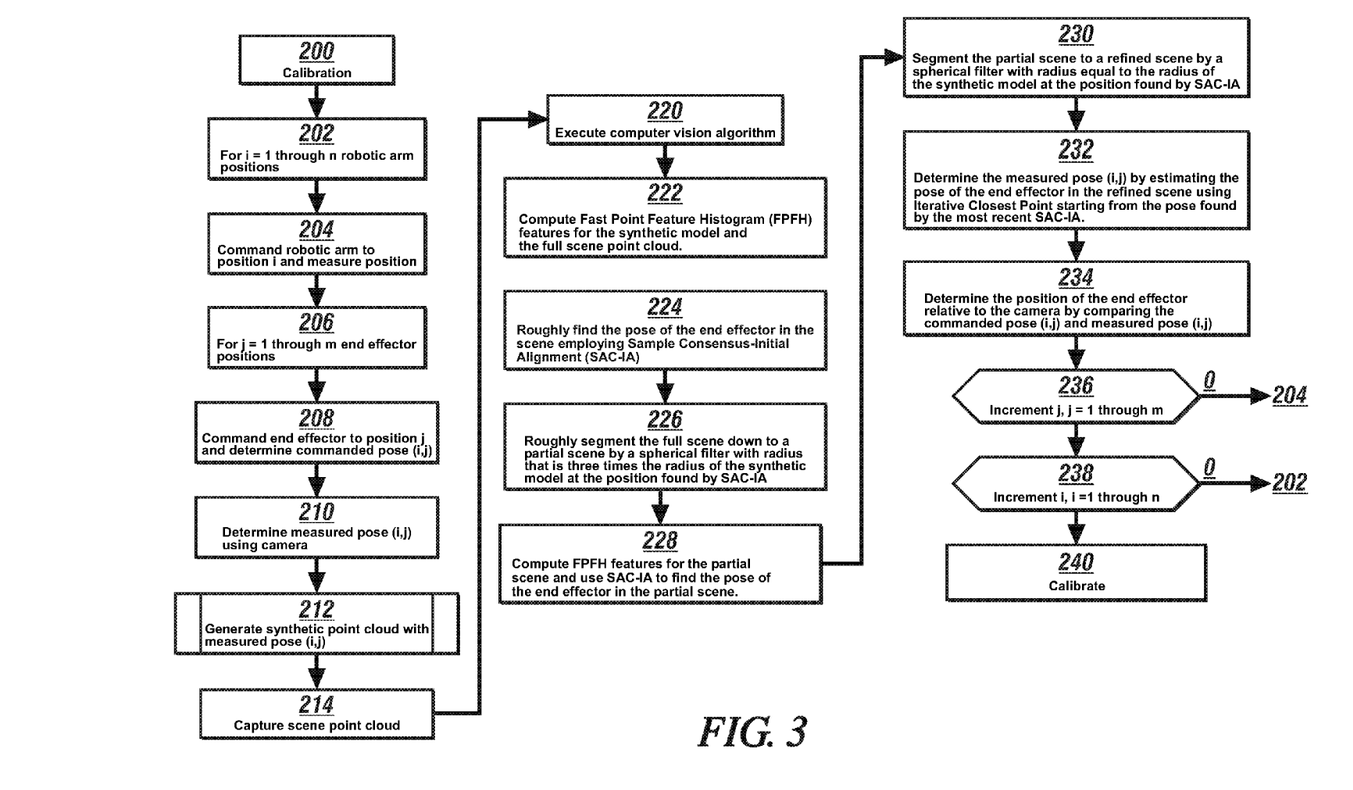
FIG. 3 schematically shows a method for calibrating a robotic device including an articulable end effector in relation to a 3D image of the articulable end effector originating from a remotely mounted digital camera without employing external targets or other fiducial markers, in accordance with the disclosure.

FIG. 3 schematically shows a calibration method 200 for calibrating a robotic device including an articulable end effector in relation to a 3D image of the articulable end effector originating from a remotely mounted digital camera without employing external targets or other fiducial markers. The calibration method 200 is described in context of an embodiment of the robotic device 40 and camera 10 described with reference to FIG. 1 and an embodiment of the calibration process configuration 100 described with reference to FIG. 2 for purposes of illustration. The concepts of the calibration method 200 may be effectively applied to other configurations without limitation. Other arrangements and configurations may be employed to effect a spatial position calibration of a robotic device having an articulable end effector employing signals captured by a digital camera representing a 3D image of the articulable end effector in a manner that is consistent with the embodiments described herein.

Calibrating the spatial position of a robotic device having an articulable end effector includes sequentially commanding the robotic device through a series of poses while the camera captures and records 3D images of a FOV 12 that includes the articulable end effector. Data from the robot arm and end effector are combined with the sensor data and computer vision to yield a set of correspondence points suitable for computing a spatial position calibration matrix that defines the articulable end effector 44 of the robotic device in relation to the camera 10. This includes as follows.

The outcome of the calibration method 200 is to unify the first and second frames of reference 16, 46 without employing external targets or other fiducial markers. A fiducial marker is an object or image inserted into the FOV 12 that appears in the 3D image and can be employed as a reference point for scaling and orientation. Table 1 is provided as a key wherein the numerically labeled blocks and the corresponding functions are set forth as follows, corresponding to the calibration method 200.

TABLE 1

| BLOCK | BLOCK CONTENTS |
|---|---|
| 200 | Calibration |
| 202 | For i = 1 through n robotic arm positions |
| 204 | Command robotic arm to position i and measure position |
| 206 | For j = 1 through m end effector positions |
| 208 | Command end effector to position j and determine commanded pose (i, j) |
| 210 | Determine measured pose (i, j) using camera |
| 212 | Generate synthetic point cloud with measured pose (i, j) |
| 214 | Capture scene point cloud |
| 220 | Execute computer vision algorithm |
| 222 | Compute Fast Point Feature Histogram (FPFH) features for the synthetic model and the full scene point cloud. |
| 224 | Roughly find the pose of the end effector in the scene employing Sample Consensus-Initial Alignment (SAC-IA) |
| 226 | Roughly segment the full scene down to a partial scene by a spherical filter with radius that is three times the radius of the synthetic model at the position found by SAC-IA |
| 228 | Compute FPFH features for the partial scene and use SAC-IA to find the pose of the end effector in the partial scene. |
| 230 | Segment the partial scene to a refined scene by a spherical filter with radius equal to the radius of the synthetic model at the position found by SAC-IA |
| 232 | Determine the measured pose (i, j) by estimating the pose of the end effector in the refined scene using Iterative Closest Point starting from the pose found by the most recent SAC-IA. |
| 234 | Determine the position of the end effector relative to the camera by comparing the commanded pose (i, j) and measured pose (i, j) |
| 236 | Increment j, j = 1 through m |
| 238 | Increment i, i = 1 through n |
| 240 | Calibrate |

The calibration method 200 operates as follows. Index i indicates a commanded robotic arm position that corresponds to the arm commands 51, with a quantity of n robotic arm positions (202). The robotic arm is commanded to position i and the position is measured using position sensors on the robotic arm (204). Index j indicates a commanded end effector position that corresponds to the end-effector commands 53, and there is a quantity of m end effector positions (206). The end effector is commanded to position j and the position is measured using the position sensors on the robotic arm 42 and the end effector 44, resulting in a commanded pose (i,j), which is described in context of the second frame of reference 46 (208). The measured pose (i,j) is determined using information from the camera 10 as follows (210). A synthetic point cloud 59 is generated employing the commanded pose (i,j), and a kinematic model of the robotic device 40 based on the currently measured joint angles associated with the commanded pose (i,j), and described with reference to the second frame of reference 46 (212). The synthetic point cloud 59 for each commanded pose (i,j) is determined based upon known structural configuration of the robotic arm 40 using The measured pose (i,j) is also employed in Step 240 to calculate the calibration to determine an extrinsic calibration between the end effector 44 of the robotic device 40 and the camera 10 to effect hand-eye coordination without employing external targets or other fiducial markers.

The camera 10 captures an image in the FOV 12 and extracts a scene point cloud 35 that includes the end-effector 44 of the robotic device 40 at the commanded pose (i,j) (214). The scene point cloud 35 is employed to determine a measured pose (i,j) of the end effector 44, and described with reference to the first frame of reference 16. A measured pose (i,j) of the end effector 44 is determined for each commanded pose (i,j) employing the scene point cloud 35 and the synthetic point cloud 59. The measured pose (i,j) is described with reference to the first frame of reference 16.

Thus, a first point cloud corresponding to the scene point cloud 35 described with reference to FIG. 2 and a second point cloud corresponding to the synthetic point cloud 59 described with reference to FIG. 2 are generated for each commanded pose (i,j).

Computer vision is executed (220) as described with reference to the vision component 62 of FIG. 2 to determine a position of the end effector 44 relative to the camera 10 for each commanded pose (i,j) employing the scene point cloud 35 and the synthesized point cloud model 59. The purpose of the computer vision steps (steps 220 through 234) is to determine a measured pose (i,j) of the end effector 44 relative to the camera 10 for each commanded pose (i,j) employing the scene point cloud 35 and the synthetic point cloud 59.

The computer vision steps include computing Fast Point Feature Histogram (FPFH) features for the scene point cloud 35 and the synthesized point cloud model 59 (222), and roughly estimating or otherwise finding the pose of the end effector in the scene employing a Sample Consensus-Initial Alignment (SAC-IA) routine (224). The full scene is segmented to a partial scene by a spherical filter with a radius that is three times the radius of the synthetic model at the position found by the SAC-IA routine (226) and FPFH features are computed for the partial scene with SAC-IA employed to find the pose of the end effector in the partial scene (228). The partial scene is segmented to a refined scene by a spherical filter with a radius that is equal to the radius of the synthesized point cloud model 59 at the position found by the SAC-IA routine (230). The pose of the end effector in the refined scene is estimated using an Iterative Closest Point (ICP) process starting from the pose found by the most recently executed SAC-IA routine (232). The commanded pose (i,j) is compared to the measured pose (i,j) to determine the position of the end effector 44 relative to the camera 10, i.e., the measured pose (i,j) in the first frame of reference 16 can be determined (234). The commanded pose (i,j) described with reference to the second frame of reference 46 is also captured at this time.

The index j is incremented through m end effector positions (236) and the end effector position is measured and analyzed for each end effector position by iteratively executing steps 204 through 236.

The index i is incremented through n robotic arm positions (238) and the end effector position is measured and analyzed for each of the j=1 through m end effector positions for each of the i=1 through n robotic arm positions, with steps 220 through 234 iteratively executed in due course and data captured.

The calibration calculator receives the set of corresponding points relative to the camera 10 and relative to the robotic device 40, i.e., the position of the end effector relative to the camera for pose (i,j) in the first frame of reference 16 and the measured position of the end effector for pose (i,j) in the second frame of reference 46, respectively. The robot-camera calibration is represented by a rigid body transformation matrix, as described herein (240).

To test the concepts, a kinematic model of an embodiment of the robotic device 40 was placed into a simulation along with an arbitrarily-positioned simulated camera. The motion generator commanded the robot model to a series of poses while the sensor captured a point cloud of the simulated scene at each pose. The end effector pose generator commanded the robot hand to take various poses at each arm position, such as a closed fist, open spread-out hand, or two fingers touching the thumb. The model synthesizer creates synthetic point cloud models for each of these hand poses. The computer vision module detects the pose of the hand model in each of the point clouds. The calibration calculator is able to accurately reproduce the position and orientation of the simulated camera.

The calibration method described herein to unify the first and second frames of reference 16, 46 without employing external targets or other fiducial markers provides the capability to automatically determine the extrinsic camera calibration between a robot and a 3D camera. The key to robot-camera calibration is finding a set of corresponding points relative to the robotic arm and relative to the camera. In short, the robotic arm is moved through a series of poses while the camera records 3D images of the workspace. Data from the robotic arm and end effector are combined with the camera data and computer vision to yield a set of correspondence points suitable for computing the calibration matrix. The robotic arm articulates its end effector into various poses, which are perceived by the camera 10 as 3D point clouds. The forward kinematic model of the robot is used to synthesize a model point cloud of the end effector in the robot's coordinate system. Point cloud feature matching and alignment techniques are used to isolate the end effector in the sensor point cloud and match the 3D model. These matches provide correspondence points between the sensor and robot coordinate systems, which are used to calculate the extrinsic calibration.

The calibration method described herein simplifies the process of robot-camera calibration to enable the use of advanced, perception-guided robotics in flexible manufacturing environments. Its advantages are in minimizing the need for human input in the calibration process and eliminating the need for calibration patterns. It takes advantage of developments in 3D sensors and dexterous robot manipulators. It enables rapid reconfiguration for robots changing manufacturing tasks, facilitating flexible manufacturing.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for calibrating an articulable end effector of a robotic arm employing a digital camera, the method comprising:
   commanding the end effector to achieve a plurality of poses;
   for each commanded end effector pose:
      capturing an image of the end effector with the digital camera,
      generating a scene point cloud including the end effector based upon the captured image of the end effector, generating a synthetic point cloud including the end effector based upon the commanded end effector pose, determining a first position of the end effector based upon the synthetic point cloud and the scene point cloud, and determining a second position of the end effector associated with the robotic arm; and calibrating a position of the end effector based upon the first position of the end effector and the second position of the end effector for the plurality of commanded end effector poses;

wherein determining the first position of the end effector based upon the synthetic point cloud and the scene point cloud for each of the commanded end effector poses comprises:

computing Fast Point Feature Histogram (FPFH) features for the synthetic point cloud and the scene point cloud, employing a Sample Consensus-Initial Alignment (SAC-IA) method to find a rough pose of the end effector in a field of view (FOV) of the camera based upon the FPFH features for the synthetic point cloud and the scene point cloud;

segmenting the scene point cloud to a partial scene by a first spherical filter at the rough pose of the end effector found by the SAC-IA, computing FPFH features for the partial scene, employing the SAC-IA method to find the pose of the end effector in the partial scene, segmenting the partial scene to a refined scene by a second spherical filter at the pose of the end effector in the partial scene found by the SAC-IA, and employing an iterative closest point routine to estimate a pose of the end effector in the refined scene.

2. The method of claim 1, wherein generating a synthetic point cloud including the end effector based upon the commanded end effector pose comprises generating the synthetic point cloud of a surface of the end effector based upon the commanded end effector pose and a kinematic model of the robotic arm.

3. The method of claim 1, wherein calibrating the position of the end effector based upon the first position of the end effector and the second position of the end effector comprises solving for a rigid body transformation matrix to calibrate the position of the end effector based upon the first position of the end effector and the second position of the end effector.

4. The method of claim 3, wherein solving for a rigid body transformation matrix to calibrate the position of the end effector based upon the first position of the end effector and the second position of the end effector further includes using a singular value decomposition on the rigid body transformation matrix of the corresponding first and second positions.

5. The method of claim 3, wherein solving for the rigid body transformation matrix to calibrate the position of the end effector comprises solving for the rigid body transformation matrix to calibrate the position of the end effector relative to the digital camera.

6. The method of claim 1, wherein said capturing an image of the end effector with the digital camera further comprises capturing the image of the end effector with the digital camera absent a fiducial marker in a field of view including the end effector.

7. A method for calibrating an articulable end effector of a robotic arm employing a remote digital camera, the method comprising:

sequentially commanding the end effector to achieve a plurality of poses;

for each commanded end effector pose:

capturing an image of the end effector in a first reference frame with the digital camera, generating a scene point cloud including the end effector based upon the captured image of the end effector, and generating a synthetic point cloud based upon the commanded end effector pose;

determining a first position of the end effector relative to the first frame of reference based upon the synthetic point cloud and the scene point cloud for each of the commanded end effector poses;

determining a second position of the end effector relative to a second frame of reference associated with the robotic arm in each of the poses; and executing a rigid body transformation matrix to calibrate a position of the end effector in relation to the camera based upon the first position of the end effector relative to the first frame of reference and the second position of the end effector relative to the second frame of reference for the plurality of commanded end effector poses;

wherein determining the first position of the end effector relative to the first frame of reference based upon the synthetic point cloud and the scene point cloud for each of the commanded end effector poses comprises:

computing Fast Point Feature Histogram (FPFH) features for the synthetic point cloud and the scene point cloud, employing a Sample Consensus-Initial Alignment (SAC-IA) method to find a rough pose of the end effector in a field of view (FOV) of the camera based upon the FPFH features for the synthetic point cloud and the scene point cloud, segmenting the scene point cloud to a partial scene by a first spherical filter at the rough pose of the end effector found by the SAC-IA, computing FPFH features for the partial scene, employing the SAC-IA method to find the pose of the end effector in the partial scene, segmenting the partial scene to a refined scene by a second spherical filter at the pose of the end effector in the partial scene found by the SAC-IA, and employing an iterative closest point routine to estimate a pose of the end effector in the refined scene.

8. The method of claim 7, wherein generating a synthetic point cloud including the end effector based upon the commanded end effector pose comprises generating the synthetic point cloud of a surface of the end effector in the first reference frame.

9. The method of claim 7, wherein executing a rigid body transformation matrix to calibrate the position of the end effector comprises solving for a rigid body transformation matrix to calibrate the position of the end effector using a singular value decomposition on a matrix of the corresponding first and second positions.

10. The method of claim 9, wherein solving for the rigid body transformation matrix to calibrate the position of the end effector comprises solving for the rigid body transformation matrix to calibrate the position of the end effector relative to the remote digital camera.

11. The method of claim 7, wherein said capturing an image of the end effector with the digital camera further comprises capturing the image of the end effector with the remote digital camera absent a fiducial marker in a field of view including the image of the end effector.

12. A method for calibrating an articulable end effector of a robotic arm employing a remotely located three-dimensional digital camera, the method comprising:
sequentially commanding the end effector to achieve a plurality of poses;
for each commanded end effector pose:
capturing an image of the end effector in a first reference frame with the digital camera,
generating a scene point cloud including a surface of the end effector based upon the captured image of the end effector, and
generating a synthetic point cloud including the end effector based upon the commanded end effector pose;
determining a first position of the end effector relative to the first frame of reference based upon the synthetic point cloud and the scene point cloud for each of the commanded end effector poses;
determining a second position of the end effector relative to a second frame of reference associated with the robotic arm in each of the poses; and
calibrating a position of the end effector in relation to the camera based upon the first position of the end effector relative to the first frame of reference and the second position of the end effector relative to the second frame of reference for the plurality of commanded end effector poses;
wherein determining the first position of the end effector relative to the first frame of reference based upon the synthetic point cloud and the scene point cloud for each of the commanded end effector poses comprises:
computing Fast Point Feature Histogram (FPFH) features for the synthetic point cloud and the scene point cloud,
employing a Sample Consensus-Initial Alignment (SAC-IA) method to find a rough pose of the end effector in a field of view (FOV) of the camera based upon the FPFH features for the synthetic point cloud and the scene point cloud,
segmenting the scene point cloud to a partial scene by a first spherical filter at the rough pose of the end effector found by the SAC-IA,
computing FPFH features for the partial scene,
employing the SAC-IA method to find the pose of the end effector in the partial scene,
segmenting the partial scene to a refined scene by a second spherical filter at the pose of the end effector in the partial scene found by the SAC-IA, and
employing an iterative closest point routine to estimate a pose of the end effector in the refined scene.

* * * * *